United States Patent [19]

Brown

[11] Patent Number: 5,447,740
[45] Date of Patent: Sep. 5, 1995

[54] METHOD OF PRODUCING AN IMITATION MILK

[76] Inventor: Ronald L. Brown, 18369 S. Ferguson Rd., Oregon City, Oreg. 97045

[21] Appl. No.: 166,265

[22] Filed: Dec. 10, 1993

Related U.S. Application Data

[63] Continuation of Ser. No. 931,276, Aug. 17, 1992, abandoned.

[51] Int. Cl.⁶ .............................................. A23C 11/00
[52] U.S. Cl. .................................... 426/580; 426/34; 426/36; 426/41; 426/491; 426/583
[58] Field of Search ............... 426/43, 11, 580, 583, 426/34, 36, 38, 39, 41, 42, 43, 271, 490, 491, 580, 583, 585, 613, 800, 801

[56] References Cited

U.S. PATENT DOCUMENTS

| | | | |
|---|---|---|---|
| 2,119,614 | 6/1938 | Webb et al. | 426/583 |
| 2,566,477 | 9/1951 | Abrahamczik et al. | 426/583 |
| 3,896,241 | 7/1975 | Malaspina et al. | 426/583 |
| 3,911,143 | 10/1975 | Colmey et al. | 426/583 |
| 4,337,278 | 6/1982 | Brog | 426/583 |
| 4,397,927 | 8/1983 | Brog | 426/583 |
| 4,446,164 | 5/1984 | Brog | 426/583 |

*Primary Examiner*—Leslie A. Wong
*Attorney, Agent, or Firm*—Robert L. Harrington

[57] ABSTRACT

A substitute milk product that is produced from a base product including milk ingredients only. The base product is dairy whey that is purified to eliminate the contaminants introduced in the cheese making process. The base product is altered as necessary to restructure the desired ratio of lactose and protein and to re-balance the pH to that of milk. Substitute materials are added for replacing the fat content and to recapture the desired taste, texture and appearance of milk.

1 Claim, 1 Drawing Sheet

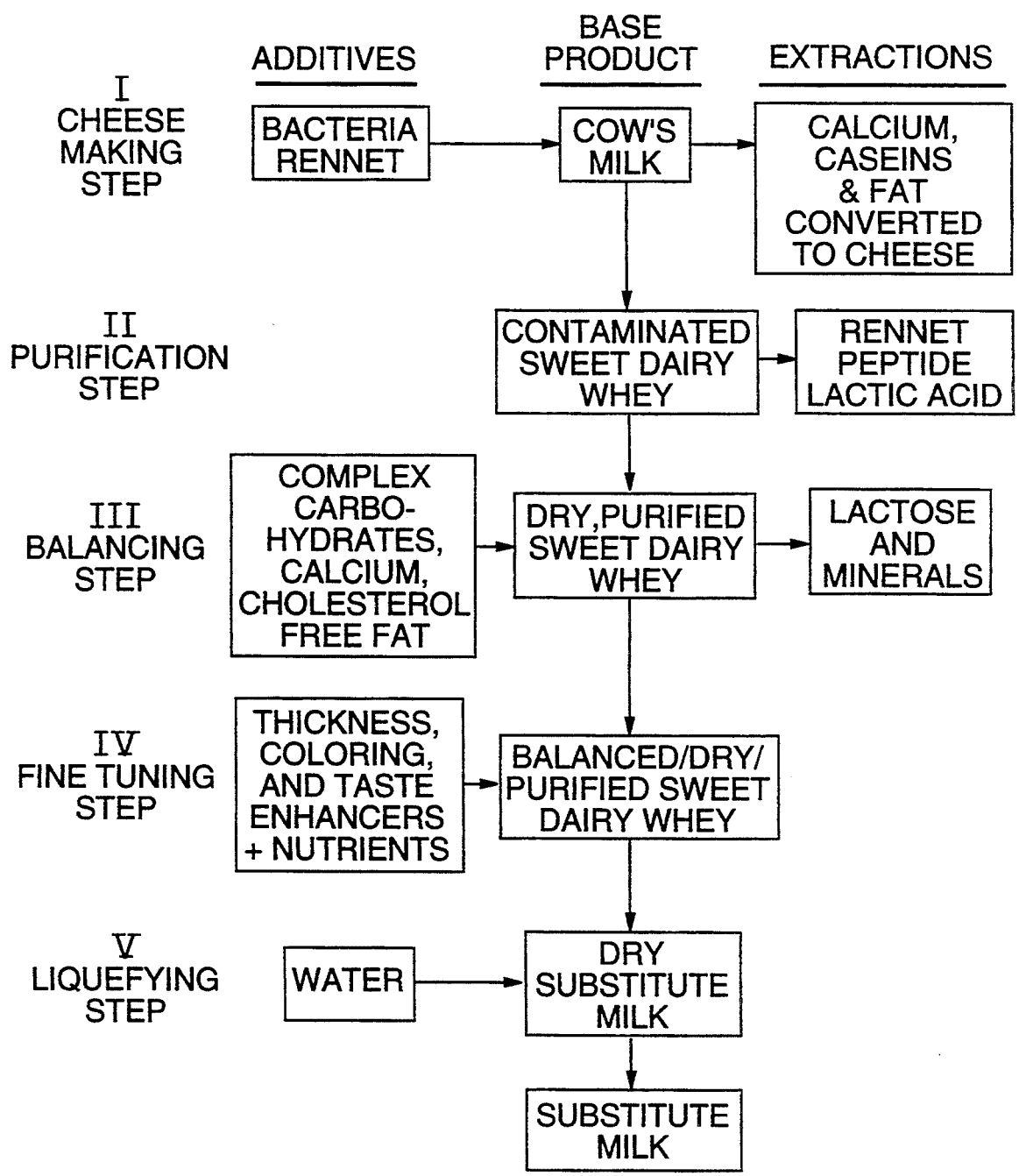

METHOD OF PRODUCING AN IMITATION MILK

This is a continuation of application Ser. No. 07/931,276 filed on Aug. 17, 1992, now abandoned.

FIELD OF THE INVENTION

This invention relates to the production of a milk substitute primarily from ingredients originating in sweet dairy whey.

BACKGROUND OF THE INVENTION

Sweet dairy whey is a co-product from cheese production. Cheese is produced from cows' milk which in dry form includes; lactose (about 38%), fat (about 26%), protein (about 26%), mineral ash (about 6%) and moisture (about 4%). The cheese making process extracts most of the fat and a selected portion of the protein out of the milk. What remains of the cows' milk is referred to as sweet dairy whey and it includes much of the desirable (nutritious) ingredients available in cows' milk.

Sweet dairy whey is well recognized as having good nutritional value but also having a texture and flavor that is repulsive as a separate food or drink. As a result, historically sweet dairy whey was considered a waste product and because it is about 90% of the original milk volume, it created a substantial disposal problem. Over time cheese producers learned to dry the sweet dairy whey and include the nutritional dry sweet dairy whey as an ingredient for animal foods. More recently, the dry sweet dairy whey has been converted into a dairy drink intended to resemble the taste and texture of milk and is referred to as imitation milk.

The principal task of the imitation milk producer was to get rid of the repulsive taste of the sweet dairy whey. Essentially this was done by producing a mixture of sweet dairy whey and "other" ingredients which typically amounted to about 50% non-processed sweet dairy whey and 50% "other" ingredients. Such mixtures are represented by the formulas found in U.S. Pat. Nos. 4,337,278, 4,397,927 and 4,446,164.

Whereas the patents overtly recognize that they do not know why the particular mixtures get rid of the bad taste, it is theorized that the bad taste is simply covered up in the mixture, first by diluting the mixture to a content of about one-half sweet dairy whey and adding in salts and flavoring.

A major reason for using the non-processed sweet dairy whey in the imitation mixture was to retain the milk taste. Thus, the use of sweet dairy whey was considered necessary and the combination of other ingredients, besides having to cover up the bad taste, had to be balanced to retain or enhance the milk taste. These factors resulted in the development of rather complex formulations as will be noted from the cited patents.

BRIEF DESCRIPTION OF THE INVENTION

The present invention resulted from taking a different approach to the task of getting rid of the repulsive taste of the sweet dairy whey and that approach included as a first step, to determine why sweet dairy whey tastes as it does.

Two things are added to milk to prepare the milk for the extraction process used in making cheese. A bacteria is added to force the separation of the fat from the lactose, and rennet is added to separate calcium caseinate from the undesired whey protein. The bacteria converts a certain portion of the lactose to lactic acid some of which remains in the sweet dairy whey, and the rennet converts a portion of the whey protein to a peptide (with perhaps some of the rennet being non-converted and also remaining in the sweet dairy whey). It is theorized that these ingredients which are added into the milk co-product in the cheese making process and which never existed in the original milk product, is what creates the bad taste.

Applicant's solution to this bad taste of sweet dairy whey is to remove the foreign, bad tasting ingredients while retaining the desired ingredients of the original milk product. A conversion technique can be accomplished to a limited extent, e.g., by raising the pH of the lactic acid and thereby neutralizing the acidic taste. Physical removal is particularly preferred for the rennet and peptide and is accomplished by identifying the properties of rennet and peptide (and lactic acid if the conversion step is not employed) which distinguish those ingredients from the desired ingredients of the sweet dairy whey (which is primarily lactose and whey protein). This is followed by applying the appropriate separating process which separates out the rennet and peptide (and lactic acid) and leaves only the milk ingredients. Because of the departure from the process used to make the product known as imitation milk, the present product is referred to herein as a milk substitute to avoid confusion.

The imitation milk formula is primarily developed in a trial and error process. Sweet dairy whey was mixed in with numerous other ingredients such as sugars, protein, fat and the like. Just as one formula seemed to substantially recapture the milk taste (with the assumption that the problem had been solved) another different formula would be found to produce a similarly acceptable milk taste. Various theories were developed as to why these formulas worked, and those theories became the basis of patents. However, the patentee often acknowledged that it was not known why a particular formula or ingredient worked.

The present invention is based on a theory which applies to all of the various formulas. As discussed above, that theory in part is based on the bad taste being solely the result of the cheese making process adding ingredients (referred to as contaminants) into the dairy whey. These ingredients are extremely bad tasting and generate the bad taste in the whey, even though they exist in very small amounts. The bad taste is produced by lactic acid induced by bacteria added and peptide resulting from the addition of the rennet. Also, among these bad tasting contaminants is the remnant of the rennet itself.

The second part of the theory is that the taste of milk was not lost in the process of delactosing the dairy whey, but rather was the result of the structural alternative generated by the cheese making process. Milk as previously explained is mostly lactose, protein and fat which exists in milk in fairly stable proportionate amounts of about 3 . 2 . 2, respectively. When that proportionate relationship is dramatically upset, the milk taste is lost. Cheese makers extract the fat and certain protein and the resultant product (sweet dairy whey) is left with a restructured relationship of lactose, protein and fat in the order of 7 . 1 . 0 . 1. The bad taste can be removed (as previously described) but the original milk taste has to be recaptured through a re-balancing of the remaining ingredients and replacement of the removed ingredients.

As a third part of this theory, the taste of milk is in part the result of the acid to alkaline balance. Milk has an acidity reading of about 6.65. Diary whey has an acidity reading of about 5.65. The acidity balance should be returned to about the 6.65 range in order to insure the taste of milk although a range of about 6.3 to 7.0 is believed acceptable.

In brief, the basis of the present invention is (a) the purification of sweet dairy whey, (b) restructuring the balance as between the lactose and protein in the purified sweet dairy whey, (c) balancing the pH factor, and (d) adding into the restructured-purified sweet dairy whey those ingredients that recapture the taste, texture and appearance that were altered as a result of extracting the butter fat and casein from the milk to make cheese. In this latter step, the formulator can generate a combination of replacement additives that improves the final mixture over that of milk, e.g., by reducing the lactose in the mixture, reducing or eliminating cholesterol, reducing fat content, increasing vitamins and other nutrients, and the like.

Having thus explained the invention in brief, the reader will obtain an increased understanding of the invention and its benefits with reference to the following detailed description that follows.

DESCRIPTION OF THE DRAWINGS

The single FIGURE is a flow chart illustrating the process of producing a purified milk substitute in accordance with the present invention.

DETAILED DESCRIPTION

Reference is made to the drawing which schematically illustrates the process for producing the milk substitute of the present invention.

A major consideration of the present invention is the removal of contaminants introduced into the dairy whey in the cheese making process. Thus, the first step of the present invention requires reference to the cheese making process. At Step I of the drawing, the start-up base product is cow's milk with the additives bacterium and rennet being added to cow's milk as used for facilitating the extraction of the casein component of the protein and the butter fat. The caseins function to congeal the fat and through a pressing operation the cheese is produced.

The precise process and formulation used to make cheese is not a factor in the present invention. What is a factor and what needs to be appreciated is that a very substantial quantity of the protein previously available in the cow's milk has been removed. This protein is calcium caseinate. The calcium caseinate effects taste and texture and the casein component thereof is a factor in congealing the fat which also effects taste, texture and appearance.

With the extractions, the base product becomes a contaminated sweet dairy whey as indicated at Step II. This base product is composed of about 20% of the original protein referred to as whey protein or lactalbumin, about 4% of the original fat and about 95% of the original lactose. For comparison purposes, the ingredients of dry milk and dry sweet dairy whey are compared (i.e., the water having been removed and the ingredients converted to solid form).

|  | Milk | Sweet dairy whey |
| --- | --- | --- |
| Lactose | 38% | 74% |

-continued

|  | Milk | Sweet dairy whey |
| --- | --- | --- |
| Protein | 26% | 13% |
| Fat | 26% | 1% |
| Minerals (Other) | 10% | 12% |

Not indicated above for the dairy whey is the ingredients of lactic acid, peptide and rennet. The lactic acid is generated out of the lactose, converted to the acid form by the bacteria. The peptide is generated out of the protein, converted to the peptide form by the rennet. It is believed that all of the rennet is not expended in the process and that a small amount exists in the sweet dairy whey. All three are present in very minor amounts. However, all have a very strong and repulsive taste and, accordingly, they are believed to be the principal reason for the bad taste of the dairy whey.

The other distinguishing properties of sweet dairy whey as compared to milk, is that the sweet dairy whey has a watery texture and color (believed largely due to the loss of the butter fat but in part due to the loss of a major portion of the protein). Also, the sweet dairy whey (compared to milk) has a different pH factor. Milk typically has a pH factor of 6.65. Whey has a pH factor of 5.65 making it substantially more acidic. Recapturing the proper pH balance is believed a further important step in re-establishing the desirable taste of the end product.

Step II of the process illustrated in the drawing is the purification step. In effect, this step involves the removal of the lactic acid and peptide and to the extent that there is unexpended rennet, the rennet as well. This is accomplished by identification of the properties of lactic acid, peptide and rennet that differentiate them from the lactose and the protein originating from the milk. For example, these materials are believed to be less soluble than the lactose, protein, fat and minerals of milk. Thus, a procedure of separation includes the cooling of the product to force precipitation of these less soluble materials, and then filtering the whey whereby the contaminants are separated from the whey.

It has been determined that this method does remove the contaminants. However, some of the lactose is typically removed as well. It is theorized that the lactic acid of these contaminants is the most soluble and probably has a solubility factor that is somewhat close to that of lactose. Thus, removing the lactic acid appears to require a partial removal of the lactose. (However, removal of some of the lactose may be desirable as will be hereafter developed.)

Step III is the balancing step. Refer back to the comparison between milk and sweet dairy whey. The percentages of lactose, protein, fat and minerals (including "other") in milk is 38 . 26 . 26 . 10. For sweet dairy whey they are 74 . 13 . 1 . 12, respectively. Thus, a precipitation/filtration process can be applied that both removes the contaminants and reduces the lactose to a range that is acceptably close to the desired 3 to 2 ratio of lactose to protein, i.e., as exists in milk. However, this process of distillation raises the minerals content and thus the preferred processing of the base material also includes demineralization. A suitable base material will end up with approximate percentages in the range of 56% lactose, 36% protein, 2% fat and 4% minerals and other. The higher percentages for lactose and protein as compared to milk (these materials amounting to more than the 64% contained in milk) is of course the resultant effect of having a substantially reduced fat content. This missing ingredient is accommodated, preferably, without adding back in the calories and cholesterol of butter fat.

Further balancing typically involves first drying, a process well known to the trade. A small amount of vegetable oil is added to replace in part the fat but fortified with a substantial amount of a complex carbohydrate such as corn syrup solids which tend to replace much of the qualities of butter fat (taste, texture and color) but with reduced calories and no cholesterol.

The pH is determined and typically the pH of the decontaminated, de-lactosed, de-mineralized base product is about 6.1 to 6.3. This indicates a mixture that is slightly too acidic as compared to the desired milk taste and small amounts of a material having an alkaline base, e.g., calcium, is added to raise the pH factor into the desired range of about 6.6 to 6.7 but at least in a range of 6.3 to 7.0. Because some fat (i.e., vegetable oil) is provided in the mixture, a small amount of dispersable casein is needed to insure emulsifying of the fat content. The casein is bonded to the vegetable oil in the dried state and when converted to liquid drink, the casein keeps the vegetable oil from separating out of the solution.

Step IV is referred to as a fine tuning step. It is considered a fine tuning step because it is used to bring the "almost there" end product to the final desired taste, texture and color, required most likely because of the imprecise substitutes for butter fat. The butter fat in the original milk product adds significantly to all of the desired properties of taste, texture and appearance but as explained, it is high in cholesterol and calories. The butter fat substitutes of vegetable fat and complex carbohydrates do not totally provide these missing properties. However, there are products available in the form of thickeners, flavoring and sweeteners (sucrose) which are found to achieve the desired properties in the end product with only very minor amounts of each being required.

Step V is simply the conversion of the dry substitute milk to liquid form and is accomplished by adding one cup of the dry mixture to about seven and three quarter cups of water, typically done by the consumer.

The above procedure has been found to produce a superior product to that of imitation milk in taste, texture and appearance. It also enables the formulator to predict the approximate ingredients and quantities thereof needed to achieve a desired result. For example, if more fat is desired (but without the cholesterol), more vegetable oil is added and the thickeners, flavor and sweeteners are correspondingly altered. If a low fat milk texture is desired, less thickener is used and so forth.

The removal of the contaminants is considered key to the invention. A formulator does not have to be concerned with blending out the bad taste, only blending in those materials having the desired properties of taste enhancement, thickening and flavoring to recapture the properties of the removed fat and calcium caseinate. With this knowledge, the formulator need only insure an approximate relationship of the lactose and protein, add in the fat or substitutes thereof and fine tune the end product with minor amounts of the flavoring and other additives.

The above disclosure is believed to adequately teach the invention to the person skilled in the art. Nevertheless, specific examples of end products produced out of the invention are set forth. (Certain of the compositions are dictated by the availability of commercial ingredients.)

| | | |
|---|---|---|
| 1. A. | A mixture of substantially equal amounts of whey protein concentrate (37% protein, 50% lactose) and reduced lactose whey (21% protein, 50% lactose) to provide a base product of 29% protein and 50% lactose (the remainder being small amounts of mineral, fat and moisture) | 53 parts |
| B. | Add tri-calcium phosphate to balance the pH and replace calcium (i.e., the calcium extracted as calcium caseinate) | 6 parts |
| C. | Add partially hydrogenated vegetable oil in limited but sufficient amount (as compared to milk), so as to provide a fat content as needed for taste, texture and color while minimizing cholesterol and calories | 6 parts |
| D. | Add corn syrup solids, a mild form of sweetener which provides bulk and replaces taste missing from fat and low lactose content (in the end product) | 24 parts |
| E. | Add a minor amount of sodium caseinate or potassium caseinate as desired to insure emulsifying of the vegetable oil as previously discussed | 1 part |
| F. | Add varying but minor amounts of ingredients to achieve the desired viscosity, coloring and taste, which are characterized in the trade as thickeners, coloring, flavoring and sweeteners (e.g., sucrose) | 10 parts |
| 2. A. | Whey protein concentrate having 37% protein and 50% lactose | 53 parts |
| B. | Tri-calcium phosphate | 6 parts |
| C. | Vegetable oil | 6 parts |
| D. | Corn syrup solids | 24 parts |
| E. | Sodium or potassium caseinate | 1 part |
| F. | Additives (but increasing the sucrose over that of Example 1 by about 1 part to offset the increased percentage of protein in the whey product) | 10 parts |
| 3. A. | Reduced lactose whey having 21% protein and 50% lactose | 53 parts |
| B. | Tri-calcium phosphate | 6 parts |
| C. | Vegetable oil | 6 parts |
| D. | Corn syrup solids | 24 parts |
| E. | Sodium or potassium caseinate | 1 part |
| F. | Additives (but decreasing the sucrose over that of Example 1 by about 1 part to accommodate the reduced percentage of protein in the whey product) | 10 parts |

The above examples are dictated in part by the materials that are commercially available (particularly the de-lactosed whey and whey protein concentrate). Of the three examples, Example 1 is preferred as it approaches most closely the ratio in milk of protein to lactose. Although the 3 to 2 lactose to protein ratio of milk is considered preferable, it is known that acceptable taste can be achieved with ratios of lactose to protein ranging from about 1 to 1, to about 2 to 1, and the percentage of base product in the end product mixture can vary between about 35% and 60%.

Numerous variations are possible. Some individuals may want a stronger or weaker milk taste, or a more sweet or less sweet taste. Another variation is the use of coloring/flavoring to make chocolate, orange, strawberry or other flavored drinks. Some individuals will want more or less fat content and others will want more or less protein and lactose even though taste may be sacrificed in part. All of these variables can be accommodated within reason by starting off with a desired base product that has been purified to remove the cheese making induced contaminants.

Thus, the appended claims and not the specific examples set forth above define the invention.

I claim:

1. A method of producing imitation milk consisting essentially of:
   (a) producing a base ingredient of cows' milk only having caseinate and butter fat removed therefrom, said base ingredient produced from sweet dairy whey as a byproduct in making cheese from cows' milk and including the sub-steps of:
   (i) processing the sweet dairy whey to remove contaminants entrained in the sweet dairy whey during the cheese making process namely peptides, rennet and lactic acid,
   (ii) analyzing the product of sub-step (i) to determine the protein to lactose relationship,
   (iii) processing the product of sub-step (i) to establish a ratio of protein to lactose within the range of one part protein to two parts lactose as one limitation and one part protein to one part lactose as a second limitation;
   (b) analyzing the pH factor of the product of step (a) and restructuring the product of step (a) to establish a pH within the range of 6.3 pH and 7.0 pH,
   (c) adding vegetable oil and sugar based solids as butter fat replacement while maintaining the base ingredient of step (a) as being at least 35% of the imitation milk product.

* * * * *